No. 800,865. PATENTED OCT. 3, 1905.
D. MORELL.
PACKING DISK FOR ROTARY ENGINES.
APPLICATION FILED FEB. 10, 1905.

Attest
F. R. Pitton

Inventor
David Morell
by William F. Hall
his atty.

UNITED STATES PATENT OFFICE.

DAVID MORELL, OF KASSEL, GERMANY.

PACKING-DISK FOR ROTARY ENGINES.

No. 800,865.      Specification of Letters Patent.      Patented Oct. 3, 1905.

Application filed February 10, 1905. Serial No. 245,062.

*To all whom it may concern:*

Be it known that I, DAVID MORELL, a subject of the Emperor of Germany, residing at Kassel, Province of Hesse-Nassau, in the Kingdom of Prussia, Germany, have invented certain new and useful Improvements in Packing-Disks for Rotary Engines, of which the following is a specification.

My invention relates to improvements in packing-disks for rotary engines of the kind described in the United States Patent No. 673,648, whereby the construction of the packing-disk is simplified and its effect rendered more certain; and the objects of my improvement are, first, to replace part of the rather complicated adjustable connections in the packing-disk by simple cross-holes, and, second, to divide the space between the packing-disk and the opposite head of the cylindrical casing into a greater number than hitherto of compartments by means of spring-pressed rings and ledges, so as to better balance the packing-disk and to reduce the friction between it and the adjoining face of the revolving piston. I attain these objects by the arrangement illustrated in the accompanying drawings, in which—

Figure 1:
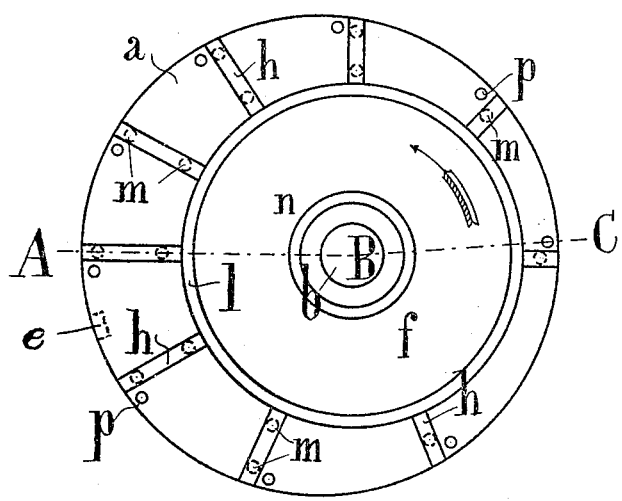
Figure 2:
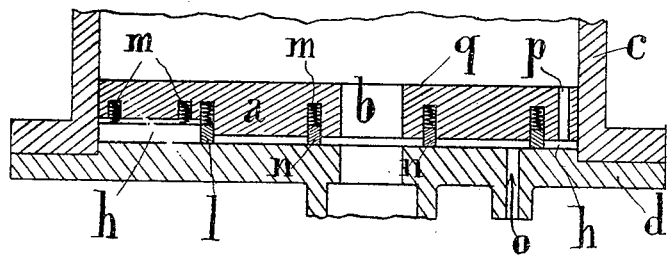

Figure 1 is an elevation of a packing-disk and shows the spring-pressed rings and ledges, and Fig. 2 is a longitudinal section through the same and parts of the cylindrical casing and of the head on the broken line A B C.

Similar letters of reference refer to similar parts in both views.

$a$ denotes a packing-disk, which is mounted in the cylindrical casing $c$ to move longitudinally. Where so preferred, this packing-disk $a$ may be prevented from turning by a feather (not shown) which is embedded in a suitable recess in the casing $c$ and engages in a notch $e$, as indicated by dotted lines. The face $q$ of the packing-disk $a$, which comes in contact with the side face of the revolving piston, (not shown,) is made plain and smooth. The other face of the disk $a$, which is opposite to the head $d$, is preferably provided with two circular grooves for the two packing-rings $l$ and $n$ and with several (here nine) approximately radial grooves for the packing-ledges $h\,h$. The two circular grooves are concentric with the bore $b$ for the engine-shaft. (Not shown.) Springs $m\,m$ are disposed on convenient places in the concentric grooves for pressing the packing-rings $l$ and $n$ against the internal face of the head $d$. The internal packing-ring $n$ is placed at a convenient small distance from the bore $b$ and divides the annular space $f$ between the two concentric rings $l$ and $n$ from the annular space around the engine-shaft. The annular space $f$ is placed in communication through a channel $o$ with a convenient cock or valve. (Not shown.) It will be seen that the annular space $f$ remains without communication with the cylinder proper, in which the piston revolves. The peripheral space between the packing-disk $a$, the casing $c$, and the head $d$ outside the external packing-ring $l$ is divided into a convenient number of peripheral compartments by an equal number of packing-ledges $h\,h$, which are adapted to move in a direction parallel with the engine-shaft in suitable grooves of the disk $a$, which grooves are preferably placed radially with respect to the bore $b$, or nearly so. The several ledges $h\,h$ should fit nicely between the casing $c$ and the external packing-ring $l$ and are pressed against the head $d$ by springs $m\,m$, similar to the other ones. Each peripheral compartment formed by the external packing-ring $l$, two neighboring ledges $h\,h$, and the casing $c$ is placed in communication with the cylinder proper by means of a cross-channel $p$. It will be seen that each part of the disk $a$ outside the external packing-ring $l$ and corresponding to either peripheral compartment is balanced by the pressure of the driving fluid acting on both faces of this part. This is of special advantage, since the pressure of the driving fluid varies in general, owing to its expansion. Then the packing-disk $a$ will never be pressed toward the head in case the pressure of the driving fluid is the highest, so that the fluid-tightness of the revolving piston is insured. As is well known, the space or spaces between the revolving piston and the cylindrical casing constantly changes or change its or their position during the rotation of the piston. Hence also the pressure of the fluid will constantly change along the periphery of the cylinder. This, however, will be of no consequence for the preservation of the tightness of the piston. The peripheral space outside the external packing-ring $l$ being divided into a number of peripheral compartments, there will always be a pressure of the fluid in each compartment which is equal to that on the other face of the respective disk part. Thus there will not be a uniform pressure in this peripheral space, as hitherto, so that the packing-disk $a$ is no longer subjected to a pressure from the cylinder, which changes its working-point. In the annular space $f$, on the contrary, a uniform adjustable pressure of the fluid is preserved by means of the cock or valve. The tension of the several springs $m$ $m$ can be made only as high as is necessary for obtaining the correct pressure between the packing-disk $a$ and the revolving piston without undue friction. By means of the cock or valve in connection with the channel $o$ the pressure of the fluid in the annular space $f$ can be adjusted within wide limits, so as to insure a smooth running of the piston. It will have to depend upon the circumstances and the kind or construction of the rotary engine how large the annular space $f$ should be made and into how many peripheral compartments the peripheral space outside the external packing-ring $l$ should be divided by spring-pressed ledges $h$ $h$.

The described packing-disk presents the advantage that it bears with a uniform moderate pressure against the revolving piston. It is easy to adjust the pressure of the fluid in the annular space $f$ to a nicety for insuring the fluid-tightness of the packing-disk and the piston.

The packing-disk illustrated is for a rotary engine with a single shaft. For rotary engines with more than one shaft it is easy to adapt the packing-ring in a manner which is obvious to any one versed in the art to which this invention appertains.

What I claim as my invention, and desire to secure by Letters Patent, is—

1. In a rotary engine, the combination with a packing-disk mounted in the casing to move in the direction of the shaft and adapted to bear against a side of the revolving piston, of means dividing the space between said packing-disk and the opposite head into a plurality of compartments, means for preserving a uniform adjustable pressure in one of said plurality of compartments, and a plurality of cross-holes in said packing-disk for placing the others of said plurality of compartments severally in communication with the cylinder proper.

2. A packing-disk mounted in the casing of a rotary engine to move in the direction of the shaft and adapted to bear against a side of the revolving piston, means dividing the space between said packing-disk and the opposite head into a central compartment and a plurality of peripheral compartments, and means for preserving a uniform adjustable pressure in said central compartment, said packing-disk being provided with a plurality of cross-holes for placing said plurality of peripheral compartments in communication with the cylinder proper.

3. In a rotary engine, the combination with a packing-disk mounted in the casing to move in the direction of the shaft and adapted to bear against a side of the revolving piston, of two circular elastic partitions dividing the space between said packing-disk and the opposite head into an annular compartment concentric with the shaft and an eccentrical peripheral space, a plurality of elastic partitions dividing said eccentrical peripheral space into a plurality of peripheral compartments, means for preserving a uniform adjustable pressure in said annular compartment, and a plurality of cross-holes in said packing-disk for placing said plurality of peripheral compartments in communication with the cylinder proper.

4. A packing-disk mounted in the casing of a rotary engine to move in the direction of the shaft and adapted to bear against a side of the revolving piston, it being provided with two circular grooves concentric with the shaft and a plurality of approximately radial grooves extending from the external circular groove to the periphery, two packing-rings movable in said two circular grooves and adapted to form with the opposite head an annular compartment, a plurality of packing-ledges movable in said plurality of approximately radial grooves and adapted to form with the external packing-ring, the opposite head and the casing a plurality of peripheral compartments, a plurality of springs acting upon said two packing-rings and said plurality of packing-ledges for pressing them on the head, and means for preserving a uniform and adjustable pressure in said annular compartment; said packing-disk being provided with a plurality of cross-holes for placing said plurality of peripheral compartments in communication with the cylinder proper.

In testimony whereof I have affixed my signature in presence of two witnesses.

DAVID MORELL.

Witnesses:
 HEINRICH WALTER,
 PAUL SCHMIDT.